US006329912B1

United States Patent
Takahashi et al.

(10) Patent No.: US 6,329,912 B1
(45) Date of Patent: Dec. 11, 2001

(54) MASTER CONTROLLER

(75) Inventors: Toru Takahashi, Mito; Naoki Kusano, Hitachinaka, both of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/644,826

(22) Filed: Aug. 24, 2000

(30) Foreign Application Priority Data

Jan. 7, 2000 (JP) .................................................. 12-005949

(51) Int. Cl.$^7$ ............................................... B60Q 1/00
(52) U.S. Cl. .................... 340/456; 246/1 C; 246/167 R; 701/19; 701/20
(58) Field of Search ........................................ 340/456, 453; 701/19, 20; 246/1 C, 103, 167 R, 169 R, 182 G, 187 R, 219

(56) References Cited

U.S. PATENT DOCUMENTS 3,582,971 * 6/1971 Coccia .................................. 246/182
5,086,641 * 2/1992 Roselli .................................. 73/1 D
5,590,042 * 12/1996 Allen, Jr. et al. ................. 246/182 B

* cited by examiner

Primary Examiner—Brent A. Swarthout
(74) Attorney, Agent, or Firm—Antonelli, Terry, Stout & Kraus, LLP

(57) ABSTRACT

In addition to two rotation angle sensors which output a signal corresponding to each notch position representing "power", "neutral" and "brake" and are interlocked to rotation of a handle of the master controller, a position sensor for detecting the "neutral" position is provided separately. When the handle is set to the "neutral" position, it is determined whether the rotation angle sensor detects the "neutral" position or not based on the output of the position sensor, and an output of the rotation angle sensor which does not detect the "neutral" position is released. A master controller having a redundancy performance can be provide in which, when one of two rotation angle sensors of the master controller produces an abnormality, a non-conformance is produced between output values of the two rotation angle sensors, and this condition is used to select one of the outputs which will allow operation of a locomotive vehicle to be continued safely.

1 Claim, 5 Drawing Sheets

BRAKE  θ1, θ2  POWER
-40° -30° -20° -10° 0° 10° 20° 30° 40°
B4 B3 B2 B1 N P1 P2 P3 P4

← BRAKE DIRECTION    POWER DIRECTION →

| FIRST SYSTEM / SECOND SYSTEM | DETECTION NOTCH | | | | | | | | |
|---|---|---|---|---|---|---|---|---|---|
| | | B4 | B3 | B2 | B1 | N | P1 | P2 | P3 | P4 |
| DETECTION NOTCH | B4 | B4 | B4 | B4 | B4 | B4 | B4 | B4 | B4 | B4 |
| | B3 | B4 | B3 | B3 | B3 | B3 | B3 | B3 | B3 | B3 |
| | B2 | B4 | B3 | B2 | B2 | B2 | B2 | B2 | B2 | B2 |
| | B1 | B4 | B3 | B2 | B1 | B1 | B1 | B1 | B1 | B1 |
| | N | B4 | B3 | B2 | B1 | N | N | N | N | N |
| | P1 | B4 | B3 | B2 | B1 | N | P1 | P1 | P1 | P1 |
| | P2 | B4 | B3 | B2 | B1 | N | P1 | P2 | P2 | P2 |
| | P3 | B4 | B3 | B2 | B1 | N | P1 | P2 | P3 | P3 |
| | P4 | B4 | B3 | B2 | B1 | N | P1 | P2 | P3 | P4 |

↑ BRAKE DIRECTION  POWER DIRECTION ↓

FIG. 6

| TIME | TRUE NOTCH | DETECTION NOTCH | | OUTPUT NOTCH |
|---|---|---|---|---|
| | | FIRST SYSTEM (NORMAL) | SECOND SYSTEM (ABNORMAL) | |
| t1 | P4 | P4 | P2 | P2 |
| t2 | P3 | P3 | P1 | P1 |
| t3 | P2 | P2 | N | N |
| t4 | P1 | P1 | B1 | B1 |
| t5 | N | N | B2 | B2 |
| t6 | N | N | (B2) → SECOND SYSTEM ABNORMALITY DIRECTION / SECOND SYSTEM RELEASE | N |
| t7 | P1 | P1 | (B1) | P1 |
| t8 | P2 | P2 | (N) | P2 |
| t9 | P3 | P3 | (P1) | P3 |
| t10 | P4 | P4 | (P2) | P4 |

MASTER CONTROLLER

BACKGROUND OF THE INVENTION

1. [Technical Field]

The present invention relates to a master controller and a railway vehicle use master controller for and in particularly to a technique in which plural rotation angle sensors for as a construction for obtaining a notch signal are provided in a master controller.

2. [Prior Art]

Recently, a construction as a master controller, in which a notch signal being interlocked to a handle is outputted, is changed to an electric system using an encoder or an electrostatic capacity sensor from a mechanical system using a cum switch. For one example, there is one technique shown in (1) Japanese application patent laid-open publication No. Hei 7-107625 and another technique shown in (2) Japanese application patent laid-open publication No. Hei 10-80010.

In the above stated conventional master controller techniques, the rotation angle sensor is formed with a double system and then a reliability performance of a train operation can be heightened, however as to relating to a redundancy performance in a train operation it is not taken into consideration.

Namely, in a case of the above stated conventional technique shown in (1) Japanese application patent laid-open publication No. Hei 7-107625, it can correspond only to a case where one of the two rotary encoders is out of order and a signal transmission comes to end, however it does not refer to a case in which values of both signals are slipped off, etc.

Further, in a case of the above stated conventional technique shown in (2) Japanese application patent laid-open publication No. Hei 10-80010, when a detection notch of some rotation angle sensor is not coincided with, it can be treated as an abnormality, then there is not an afraid about an error notch command.

However, when an abnormality generates on one of two rotation angles, immediately after since a controlling apparatus or a motor of a locomotive vehicle is formed to stop, in regardless of the leaving of one of the normal rotation angle, there is a problem in which a whole of a railway train is performed to stop.

SUMMARY OF THE INVENTION

An object of the present invention is to provide a master controller having a redundancy performance in a train operation in which as the master controller having two rotation angle sensors in one of the rotation angle sensors an abnormality generates, even when a non-conformance generates in the both output values of the rotation angle sensors, an operation of a railway vehicle can be continued.

The above stated object can be attained by a master controller in which signal corresponding to each of notches "power", "neutral", and "brake" is outputted from two rotation angle sensors by interlocking a handle, the master controller wherein a position sensor for detecting a "neutral" is provided separately, when the handle is positioned at the "neutral" position, whether the rotation angle sensor checks the "neutral" position or not, and an output of the rotation angle sensor which does not detect the "neutral" position is released.

The above stated object can be attained by a master controller in which a signal corresponding to each of notches of "power", "neutral", and "brake" is outputted from two rotation angle sensors by interlocking a handle, the master controller wherein output signals of the two rotation angle sensors are compared with, and when both output signals of the two rotation angle sensors differ, by selecting a signal at more brake side is selected and outputted.

BRIEF DESCRIPTION OF THE DRAWINGS

FIG. 6 is an explanatory view of a motion condition in which an abnormality generates in the present invention.

DESCRIPTION OF THE INVENTION

Hereinafter, a master controller of one embodiment according to the present invention will be explained.

Figure 1:
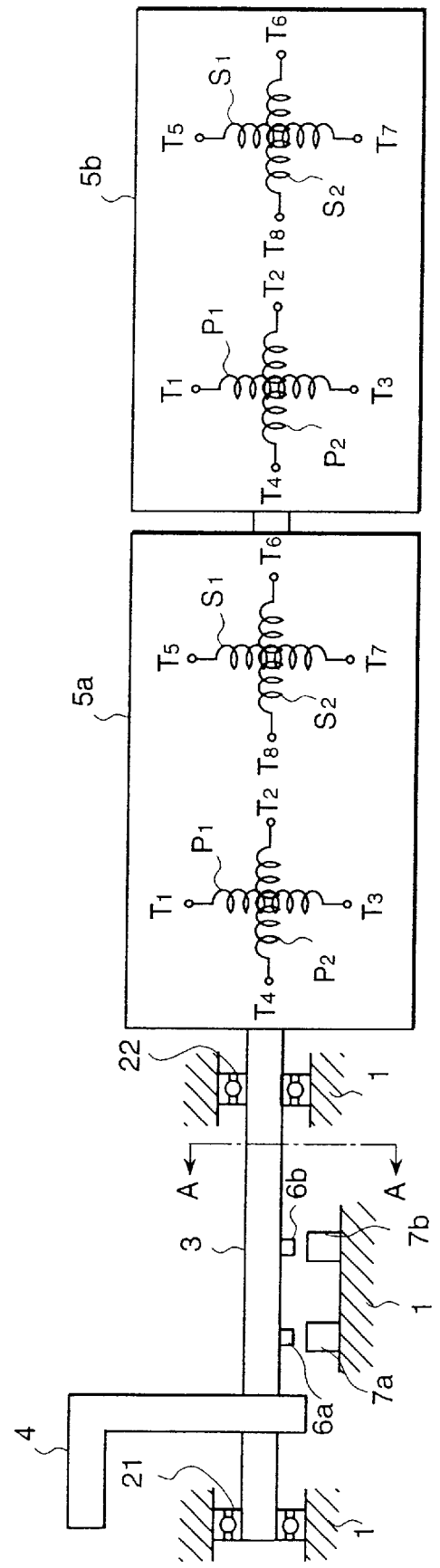
FIG. 1 is a structure view of showing a master controller viewed from an operator side of one embodiment according to the present invention.

FIG. 1 is an orthogonal cross-sectional view from a master controller taken from an operator side. To a frame 1 a shaft 3 is installed rotatively freely through bearing members 21 and 22 and the shaft 3 is carried out a rotation motion according to a handle 4 which is operated by an operator. The positions enable to be taken by the handle 4 in this embodiment according to the present invention, are nine (9) portions which are "brake 4 notch" (hereinafter it is abbreviated as "B4"),"brake 3 notch" (hereinafter it is abbreviated as "B3"), "brake 2 notch" (hereinafter it is abbreviated as "B2"), "brake 1 notch" (hereinafter it is abbreviated as "B1"), "neutral notch" (hereinafter it is abbreviated as "N"), "power 1 notch" (hereinafter it is abbreviated as "P1"), "power 2 notch" (hereinafter it is abbreviated as "P2"), "power 3 notch" (hereinafter it is abbreviated as "P3"), and "power 4 notch" (hereinafter it is abbreviated as "P4").

Further, a number of the notches is not always necessary to have the same one in this embodiment according to the present invention, for example, it can be thirteen (13) portions, such as "B7", "B6", "B5", "B4", "B3", "B2", "B1", "N", "P1", "P2", "P3", "P4", "P5".

To the shaft 3, two rotation angle sensors 5a and 5b are installed, and in response to the detection angle thereof, each of the notches of the above stated "B4", "B3", "B2", "B1", "N", "P1", "P2", "P3", "P4" are assigned. As to the two rotation angle sensors 5a and 5b, the two rotation angle sensors 5a and 5b are employed well known resolvers, for example.

This principle in the resolver is the same of the principle of the synchronization and it uses an induction combination of the primary windings P1 and P2 and the secondary windings S1 and S2 as shown in FIG. 1. In FIG. 1, each of T1, T2, T3, T4, T5, T6, T7 and T8 indicates a power supply connection use terminal. As a structure there are a rotor and a stator and has two-phase windings which are orthogonal each other.

When to a primary side the alternating current is added, to a secondary side, when a rotation angle of the rotor is θ, the voltage which is proportional to sine (sin) and cosine (cos) can be obtained. By utilizing the voltage having sine (sin) and cosine (cos), it is possible to detect the rotation angle. Further, in this embodiment according to the present invention, as to the rotation angle sensors 5a and 5b, the resolvers are used, however in addition to these resolvers it is possible to apply a rotary encoder and the like.

On the other hand, to the shaft 3 in which the handle 4 is positioned at "N", pins 6a and 6b are wedged in, and by detecting respectively the detection of positions of the pins 6a and 6b according to position sensors 7a and 7b, "N" position is detected.

Figures 2, 5:
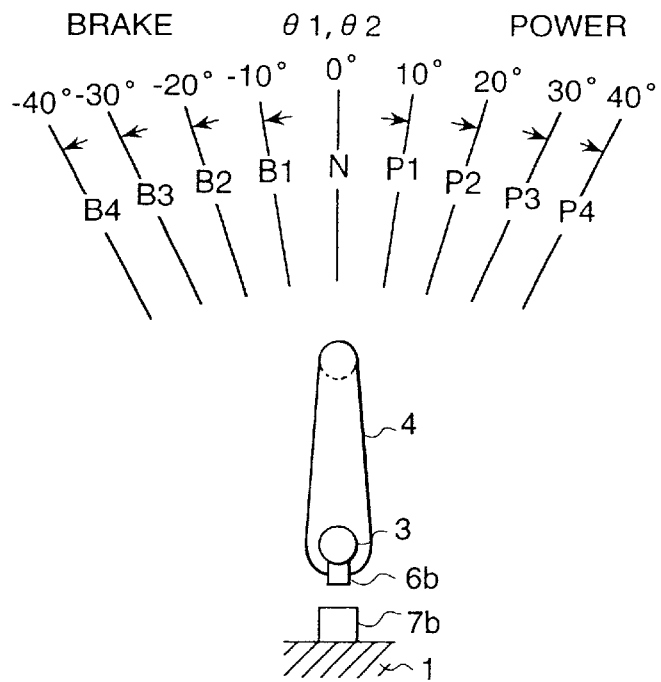
FIG. 2 is a cross-sectional view along to A—A line of FIG. 1.
FIG. 5 is a logic view showing a logic of a notch output part 9 of FIG. 3.

FIG. 2 is a cross-sectional view along to A—A line of FIG. 1. The handle 4 can be operated, as shown in this figure, in ranges of "B4", "B3", "B2", "B1","N", "P2", "P3", "P4". In accompany with this, the shaft 3, the rotation angle sensors 5a and 5b, and the pins 6a and 6b are rotated. The position of the handle 4 is set "N" as standard namely it is made $\theta1=\theta2=0$ degree, and an interval of each notches is 10 degree.

Figure 3:
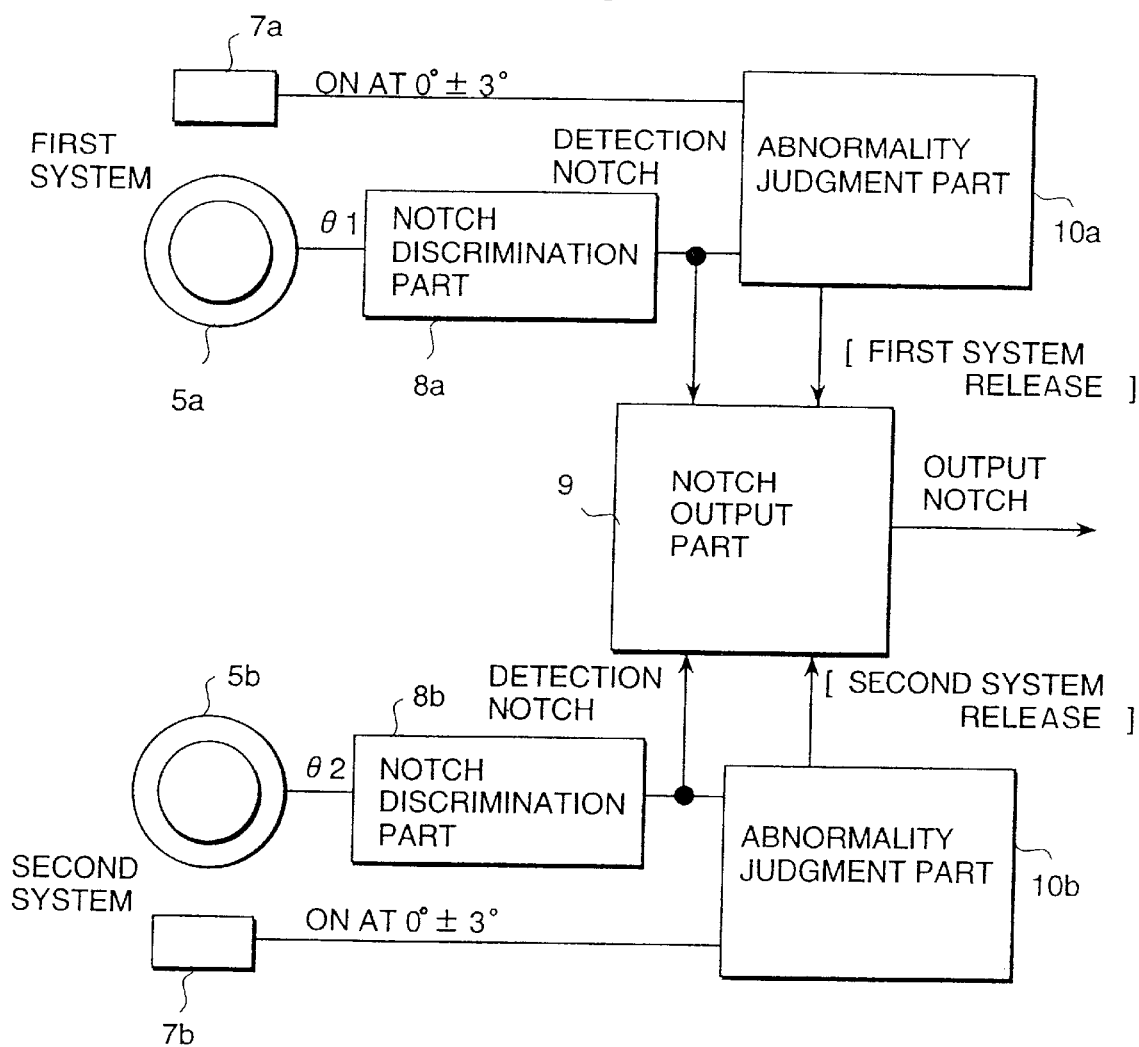
FIG. 3 is a control block diagram showing a master controller of one embodiment according to the present invention.

FIG. 3 is a control block diagram showing the master controller. As shown in this figure, the notch detection is constituted to be carried out according to two systems. In a first system, the angle output signal $\theta1$ from the rotation angle sensor 5a is inputted into a notch discrimination part 8a and the notch in response to $\theta1$ is detected and the detected notch signal is outputted. In a second system, the angle output signal $\theta2$ from the rotation angle sensor 5b is inputted into a notch discrimination part 8b and the notch in response to $\theta2$ is detected and the detected notch signal is outputted.

Further, a detail of the notch discrimination part 8a will be explained in a latter portion using FIG. 4. As to an output of the position sensor 7a, the position of the pin 6a is detected and against "N" position, only within a range of ±3 degree, an "ON" single is outputted.

The detection notch signal of the first system and the second system is inputted into a notch output part 9 and according to a logic shown in FIG. 5 an output notch is determined. Namely, when the detection notch of the first system and the detection notch of the second system are equal, such a notch is outputted but when the detection notch of the first system and the detection notch of the second system are different, a notch of a more brake direction is outputted.

For example, when the first system detects "B1" and the second system detects "P1", then "B1" is outputted. According to the output of the more brake direction, it is possible to select a safety side. In accordance with the notch output, the controllers and the motors in the locomotive vehicle during the train are operated.

An abnormality judgment part 10a is a part in which an abnormality of the rotation angle sensor 5a is judged. Herein, without of regard by fitting the handle 4 to "N" position the output of the position sensor 7a is presented to "ON" state, when the output of the rotation angle sensor 5a is not outputted the detection notch signal which corresponds to "N", "the first system release" signal is outputted to the notch output part 9. In this time, from the notch output part 9 an output notch signal according to only the detection notch signal from the second system is outputted.

Further, in this embodiment according to the present invention, to the first system and to the second system the position sensors 7a and 7b are provided respectively. However, for example, the position sensor can be provided only the first system, namely only the position sensor 7a is provided, and this output can be to input to the abnormality judgment parts 10a and 10b of the first system and the second system at the same time.

Figure 4A:
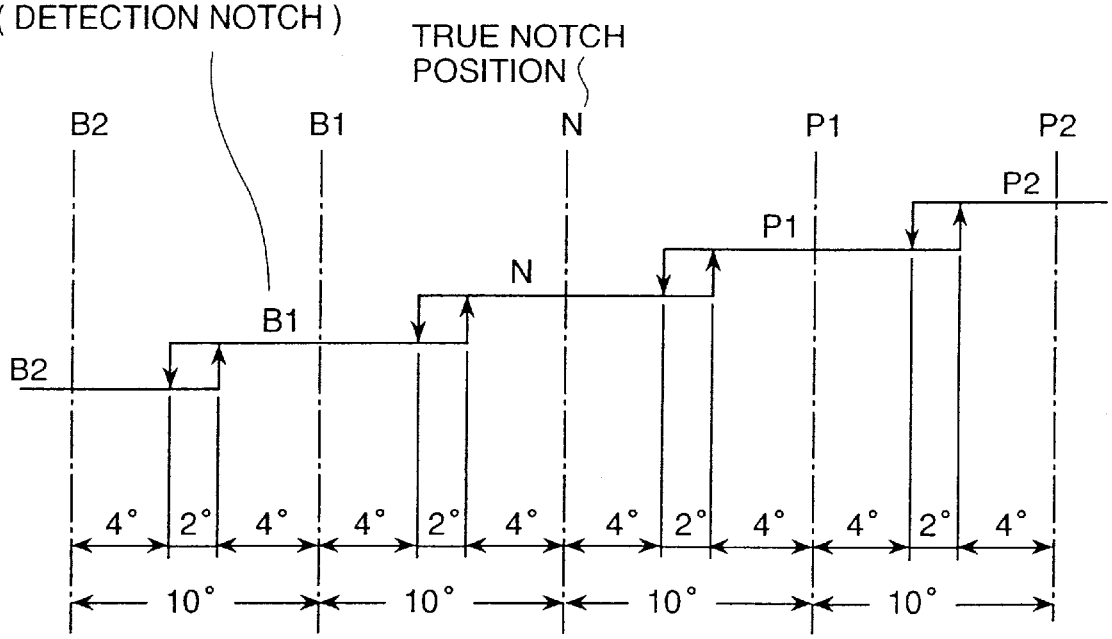
FIG. 4 is an explanatory view showing a motion condition of notch discrimination parts 8a and 8b and position sensors 7a and 7b of FIG. 3.
Figure 4B:
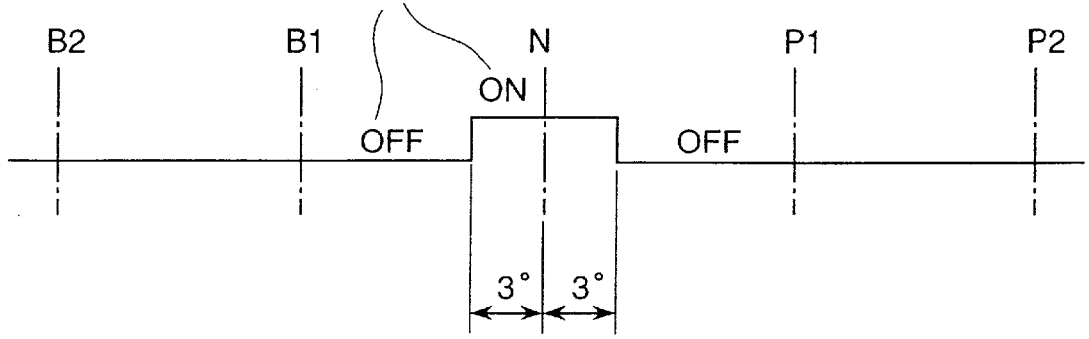

FIG. 4 shows a notch discrimination according to the angle output signal $\theta1$ from the rotation angle sensor 5a in the notch discrimination part 8a shown in FIG. 3. To carry out the notch discrimination for coming under the detection notch signal, it discriminates with a hysteresis of 2 degree.

Namely, when it proceeds from "N" to "P1", at a time where from a true notch position "N" to "P1" direction it is rotated with 6 degree, the output of the notch discrimination part 8a namely the detection notch is changed from "N" to "P1".

Similarly to, when from the "P1" it is returned to "N", at a where from the true notch position "N" it is returned to 4 degree, the output of the notch discrimination part 8a namely the detection notch is changed from "P1" to "N". The reasons why the hysteresis is provided, a chattering occurrence in a vicinity of a boundary of the notch can be prevented.

Further, in this figure, the output signal from the position sensor 7a is shown, as stated in above it states at the same time "ON" signal is outputted only a range of ±3 degree against "N" position of the handle 4.

Next, referring to FIG. 6, a motion during the abnormality will be explained. Supposing that at a time t1 in the second system namely the abnormality generated in the rotation angle sensor 5b and against the true notch "P4" the second system detection notch becomes "P2". In this condition, according to the master controller it is impossible to discriminate that either the abnormality generates in the first system and in the second system, however in accordance with the logic of FIG. 5 the output notch becomes "P2".

A process in which the handle 4 is returned to "N" is at a time t2, a time t3, and a time t4 by the operator, similarly to the condition on a time t1, it is impossible to discriminate the which system is presented the abnormality, however comparing with both systems, the notch in more brake side is outputted.

A condition in which the handle 4 is returned to the true notch "ON" is at a time t6 and the position sensors 5a and 5b are presented to an, "ON" state. However,as to the second system, since the detection notch becomes to present "B2", the abnormality judgment part 10b output "the second system release" signal to the notch output part 9. The notch output part 9 receives this signal and releases the second system, and only first system detection notch is presented to as the output notch. Accordingly, on and after this, even when the operator moves the handle 4 to "P1", "P2", "P3", "p4", only the first system detection notch is continued to output. These manners at a time t7, a time t8, a time t9, and a time t10 are shown in FIG. 6. In this FIG. 6, for example, (B2) indicates an error position error signal.

Next, it will be explained why at "N" position the abnormality detection is carried out (why at "P4", "B4", etc. the "abnormality" detection is not carried out). When the train which is stopped some station is intended to run to a next stopping station, the operation of the master controller by the operator and the conditions of the train become as a following case No. 1. Further, "B" means one of "B1", "B2", "B3", "B4" and "P" means one of "P1", "P2", "P3", "P4".

Case No. 1:

| | |
|---|---|
| some station stopping time: "B" | (stopping) |
| some station starting time: "B" ⇒ "N" ⇒ "P" | (starting, acceleration) |
| between. both .stations: "P" ⇒ "N" | (coasting) |
| between both stations: "P" ⇒ "N" | (re-power) |
| between both stations: "N" ⇒ "B" ⇒ "N" | (speed limitation) |
| next station approaching time: "N" ⇒ "B" | (deceleration, stopping) |
| next station stopping time: "B"(stopping) | |

As understood from above, when the train which is stopped at some station is intended to run to the next stopping station, the handle 4 is operated as a center of "N". As a result, every each time, it is possible to carry out the self diagnosis whether the abnormality is generated in the master controller or not.

However, supposing that to "P4" the above stated "abnormality" detection function is given, when there is a down gradient from some station to the next stopping station, it is not always to detect the "abnormality". Namely, there is a possibility in which the running is carried out not performing the power notch as shown in a following case 2. Further, supposing that it will be similar that the power notch is carried out but it operates only to "P3".

Case No. 2:

| | |
|---|---|
| some station stopping time: "B" | (stopping) |
| some station starting time: "B" ⇒ "N" | (starting under low gradient, acceleration) |
| between both stations: "N" | (acceleration under down gradient) |
| between both stations: "N" ⇒ "B" ⇒ "N" | (speed limitation condition) |
| next station approaching time: "N" ⇒ "B" | (deceleration, stopping condition) |
| next station stopping time: "B" | (stopping condition) |

In this time, when to "B4" the "abnormality" detection function is given, when only the train is stopped according to the brake operation of "B1", "B2", "B3", it is impossible to carry out the "abnormality" detection.

With the above stated reasons, it is best to the train to carry out the "abnormality" detection using "N", even when to some system the abnormality generates, without the stopping of the train operation since the train can be operated until a place for enable to mend, the redundancy performance in the train operation can be improved.

According to the present invention, when the abnormality generates to one side of the two rotation angle sensors of the master controller, such an abnormality is detected according to "N" position sensor, and this rotation angle sensor is released and using the remaining rotation angle sensor it is possible to continue the function as the master controller. As a result, the effect in which the redundancy performance in the train operation can be improved can be obtained.

What is claimed is:

1. In a master controller in which a signal corresponding to each of notches of "power", "neutral", and "brake" is outputted from two rotation angle sensors by interlocking a handle, the master controller wherein output signals of said two rotation angle sensors are compared with, and when both output signals from said two rotation angle sensors differ, by selecting a signal at more brake side is selected and outputted.

* * * * *